July 14, 1931. C. R. SCHENK ET AL 1,814,770
GRID MAKING MACHINE
Filed Aug. 3, 1926 7 Sheets-Sheet 6
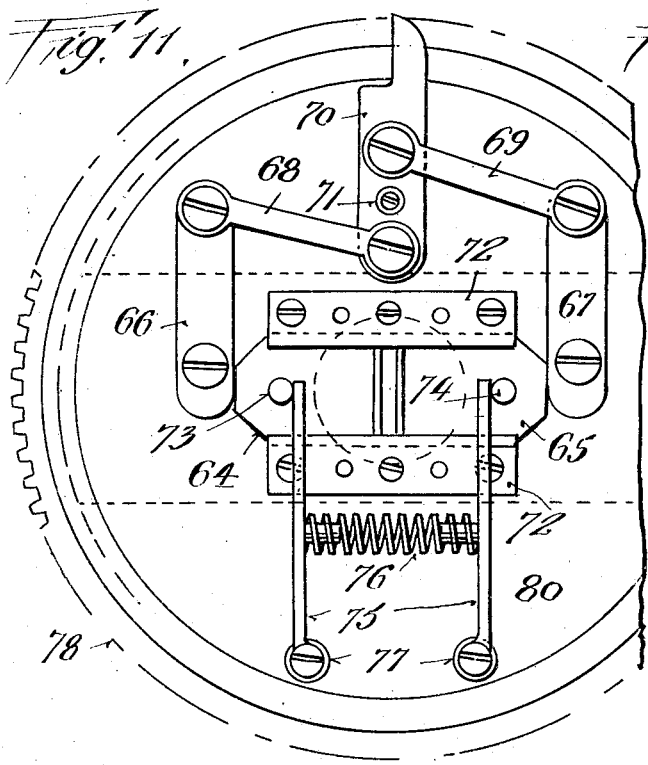
Fig. 11.
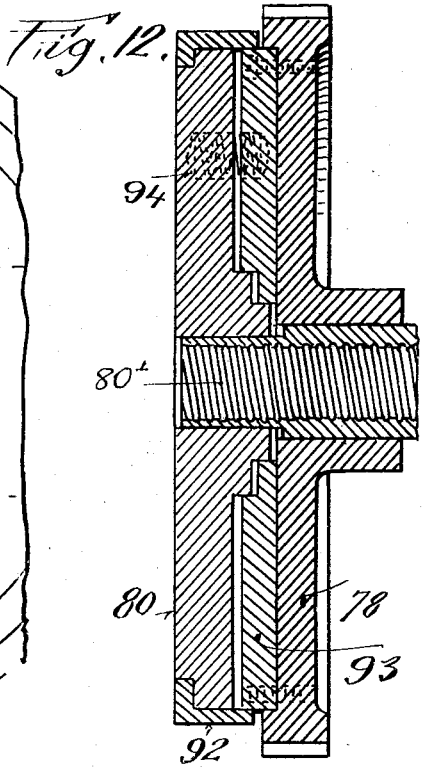
Fig. 12.
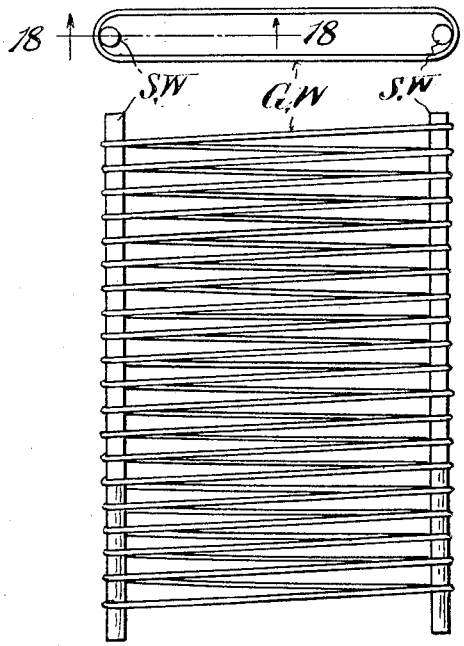
Fig. 13.
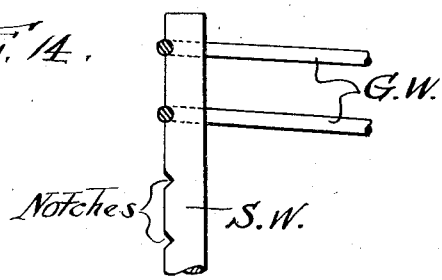
Fig. 14.
Fig. 18.
Inventors
Carl R. Schenk
Sylvester W. Crowley
By their Attorneys
Darby & Darby

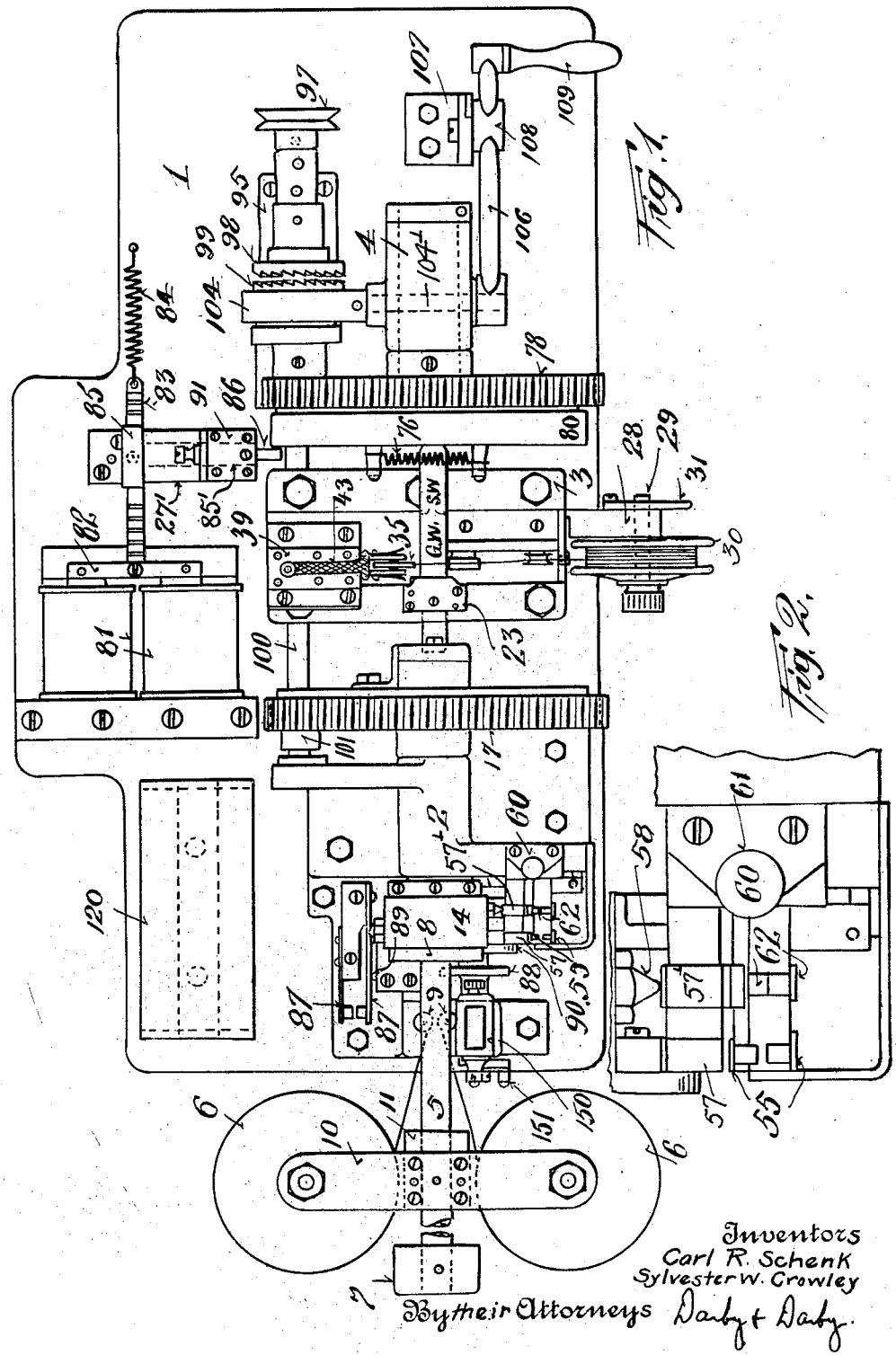

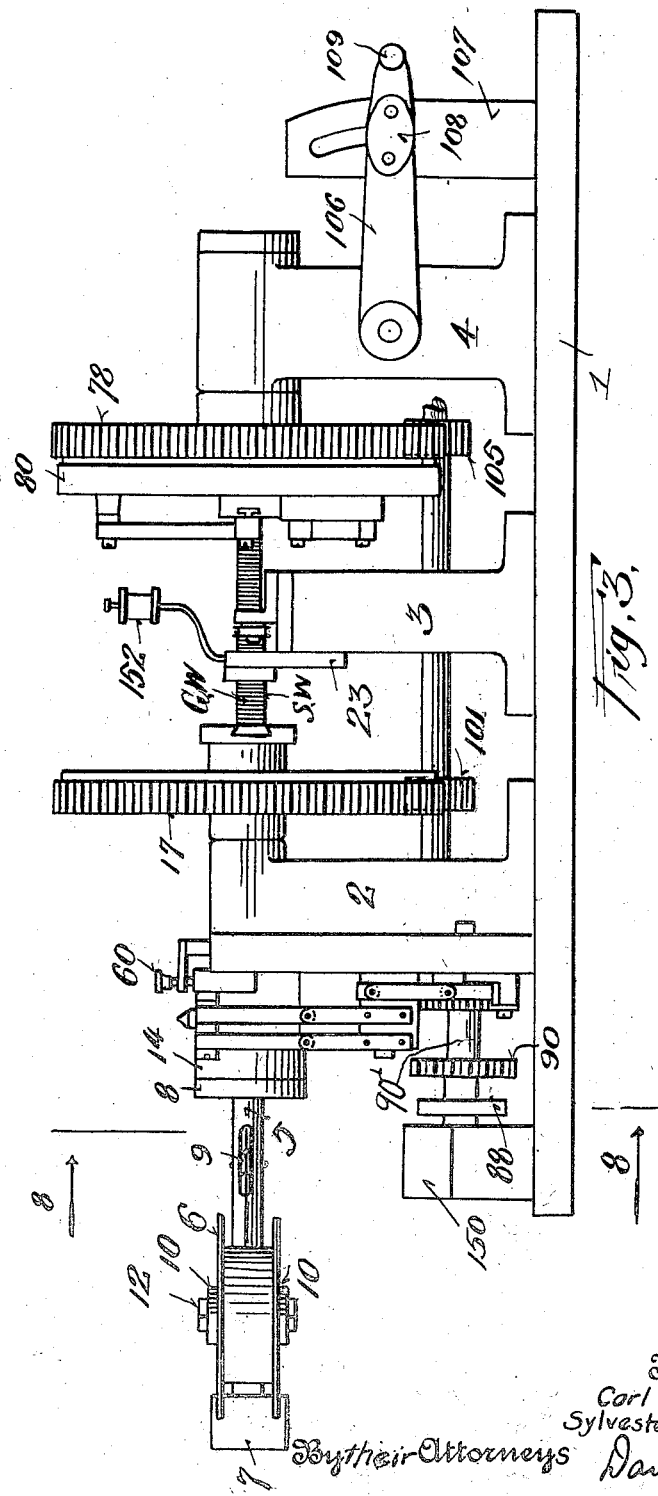

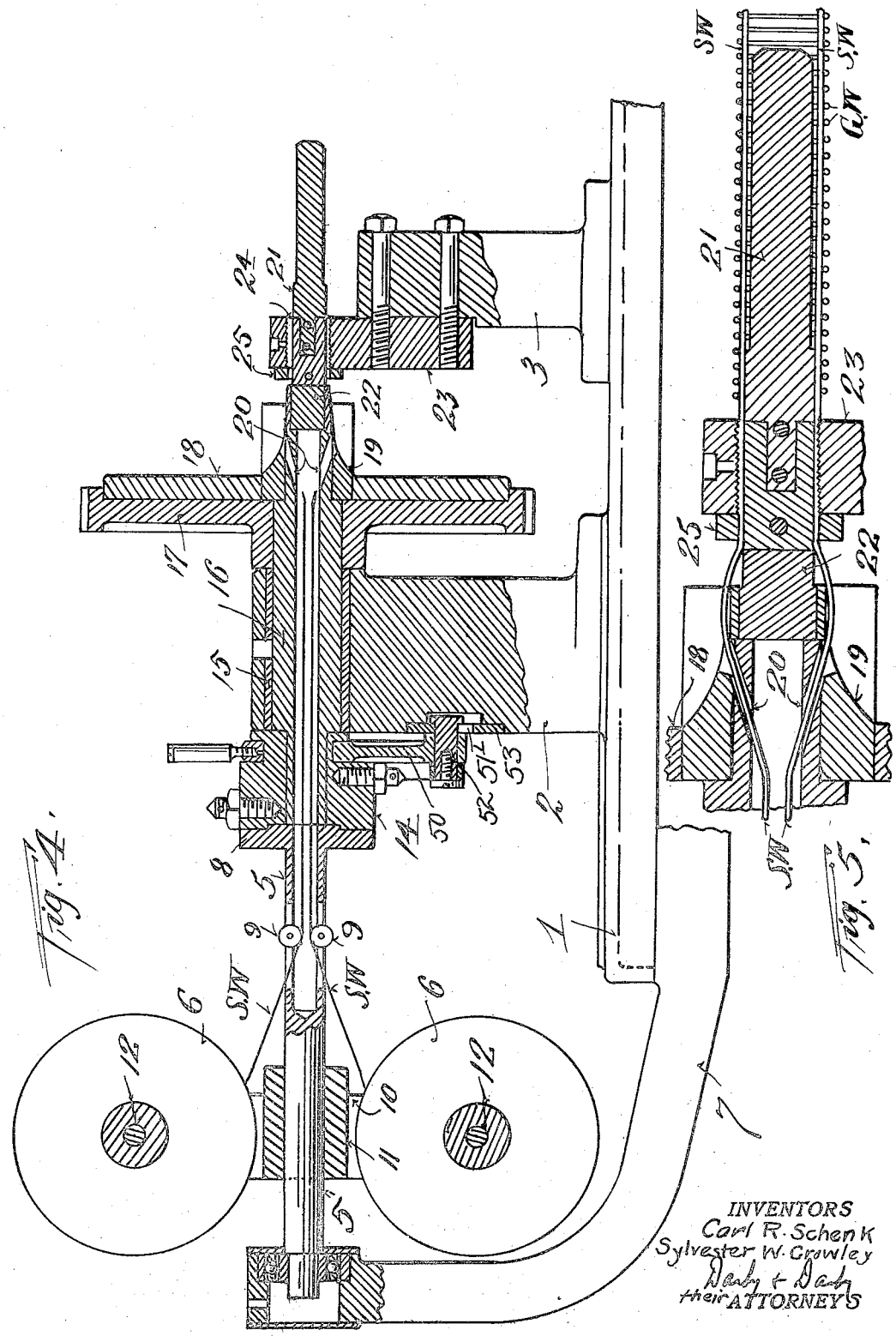

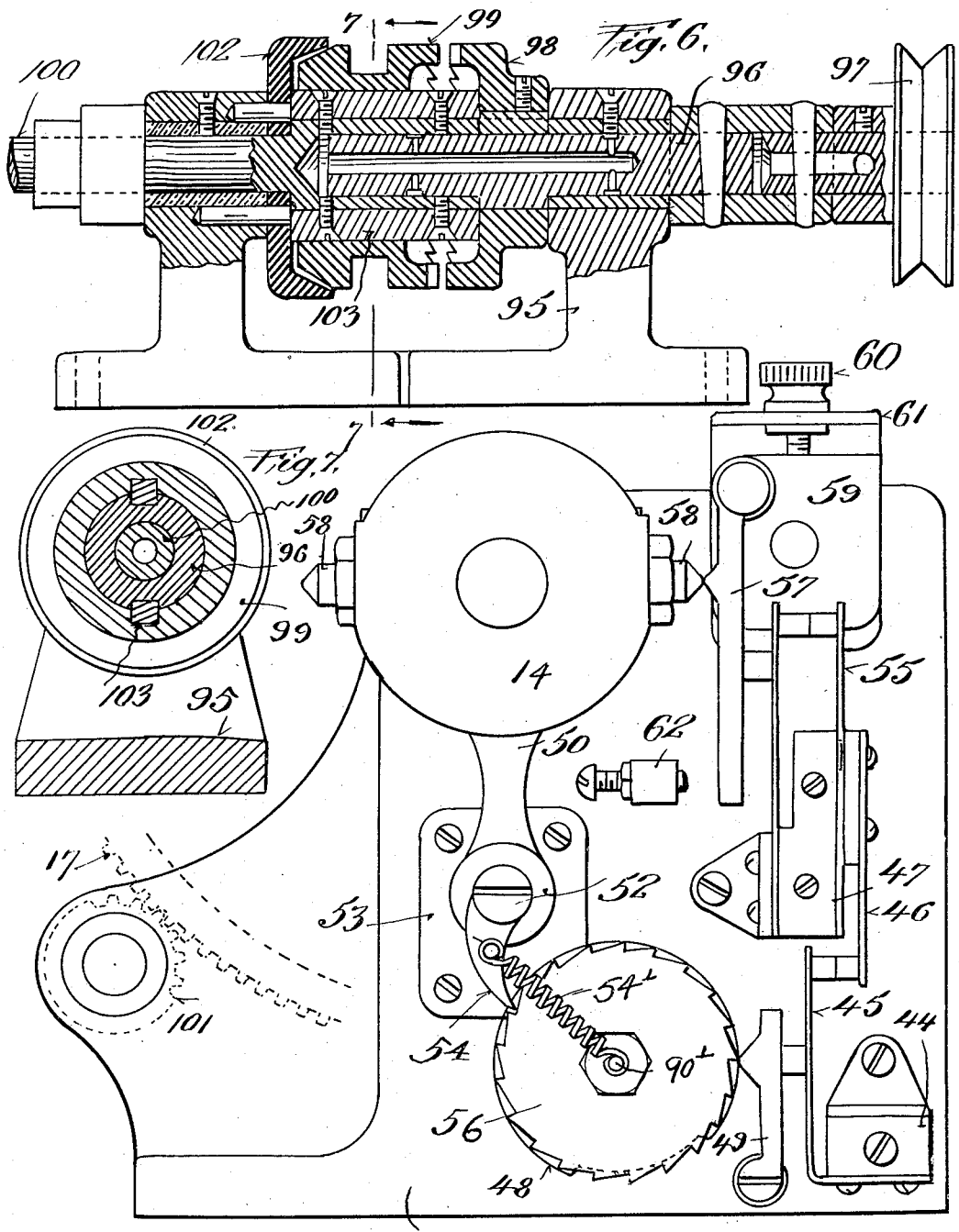

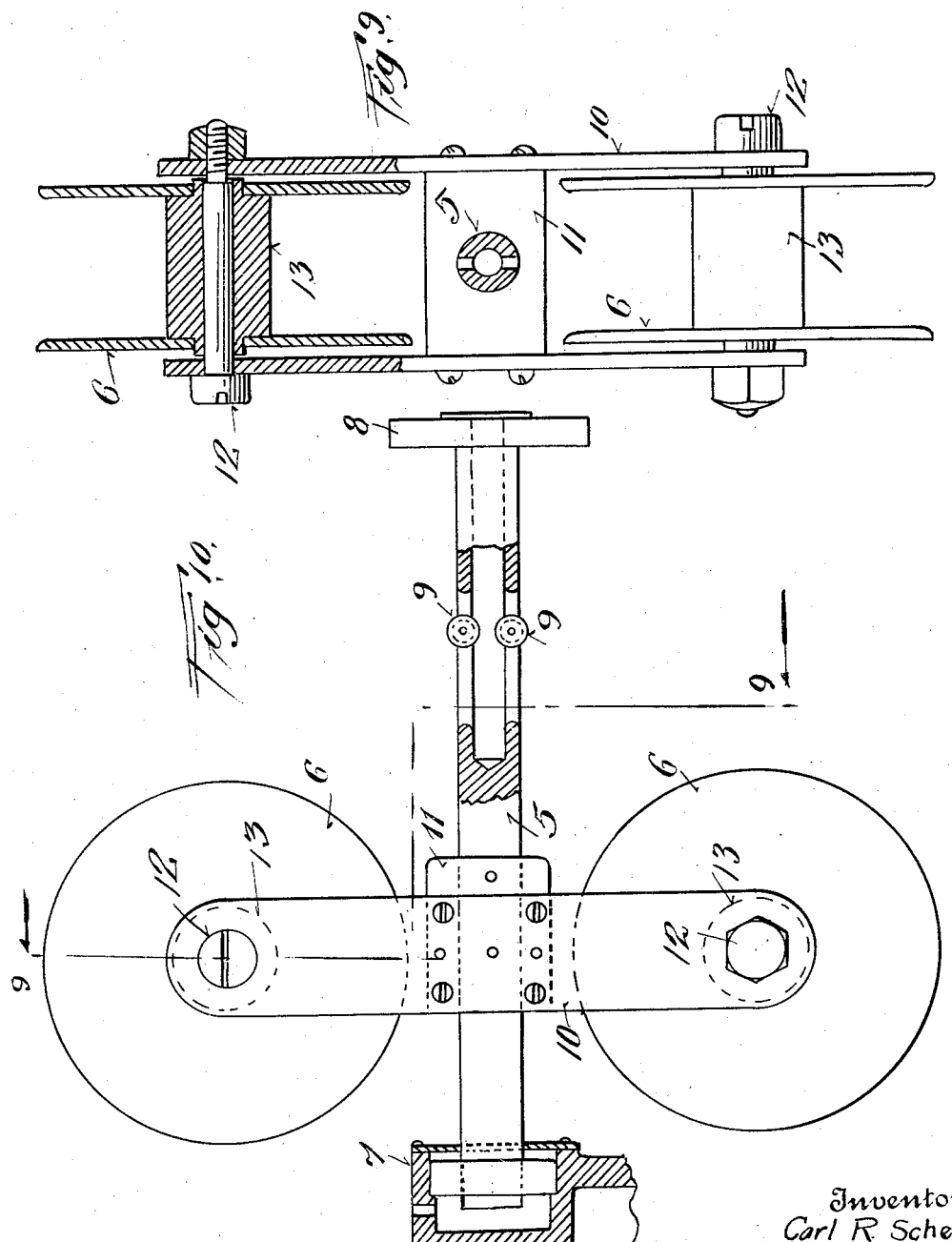

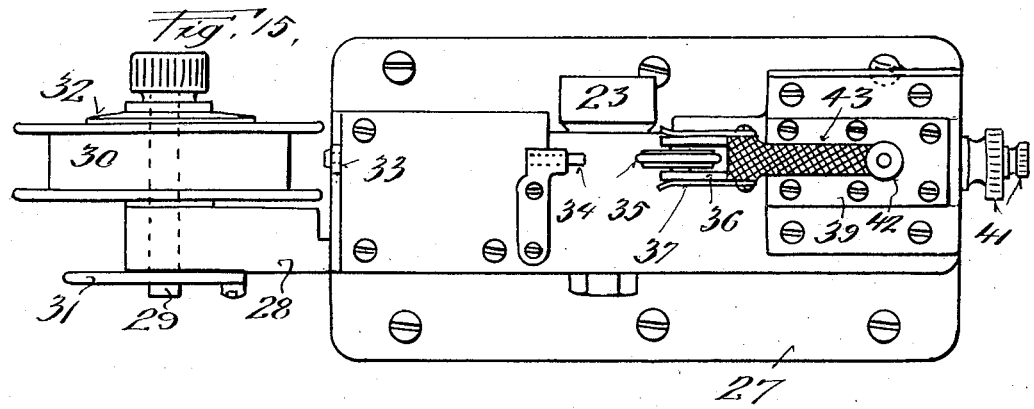
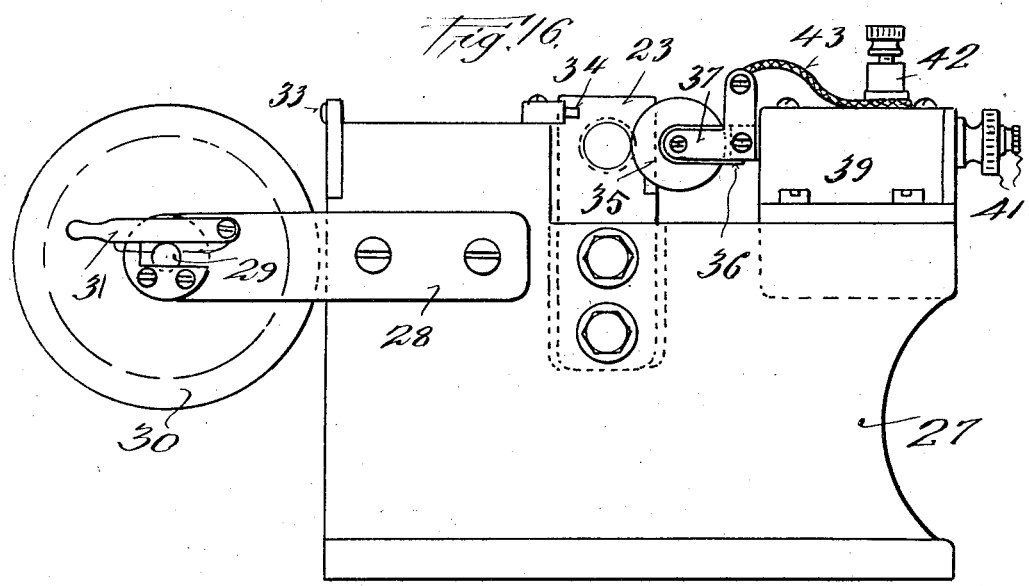
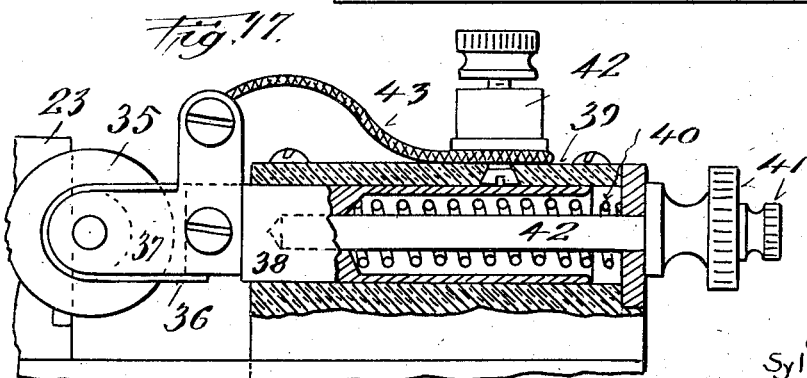

Patented July 14, 1931

1,814,770

UNITED STATES PATENT OFFICE

CARL R. SCHENK, OF JERSEY CITY, AND SYLVESTER W. CROWLEY, OF HUDSON HEIGHTS, NEW JERSEY, ASSIGNORS TO DE FOREST RADIO COMPANY, OF JERSEY CITY, NEW JERSEY, A CORPORATION OF DELAWARE

GRID MAKING MACHINE

Application filed August 3, 1926. Serial No. 126,832.

This invention relates to automatic machinery for making grids for vacuum tubes.

One of the objects of this invention is the provision of a novel automatic machine for rapidly and efficiently making grid structures for vacuum devices.

One of the objects of this invention is the provision of a device of this nature which is efficient in operation and easy to so maintain.

A further object of the invention is to provide a machine for automatically winding wire around two separated supporting posts.

Another object of the invention is to provide a machine of this character which will weld the wire to each of the supports to provide conducting connections between the supports and the wire.

A further object of the invention is the production of a machine of this type which automatically cuts the grid into a predetermined length.

Further objects of the invention will appear from the description to be given hereinafter.

The invention consists substantially in the construction, combination, location and relative arrangement of parts, all as will be more fully set forth as shown in the accompanying drawings and finally pointed out in the appended claims.

Referring to the drawings in which the same reference numerals will be used throughout the several views to indicate the same or similar parts, Fig. 1 is a top plan of the device of my invention showing relative location of all the parts thereof.

Fig. 2 is an enlarged plan detailed view of the current interrupting device for the welding element.

Fig. 3 is a side elevational view of the device with some parts removed for the sake of clearness.

Fig. 4 is a cross-sectional vertical elevational view of the structure for feeding the supports and notching them.

Fig. 5 is an enlarged cross-sectional view of the feeding devices.

Fig. 6 is an enlarged view partly in cross-section showing the clutch mechanism.

Fig. 7 is a vertical cross-sectional view of the clutch mechanism on the line 7—7 of Fig. 6.

Fig. 8 is an enlarged side elevational view of the circuit interrupting devices taken on the line 8—8 of Fig. 3.

Fig. 9 is a detailed view partly in cross-section and partly in side elevation, the cross-sectional part being taken on the line 9—9 of Fig. 10.

Fig. 10 is a side elevational view with some parts cross-sectioned showing the feeding devices for the supports.

Fig. 11 is a side elevational view with some parts broken away of the cutting devices.

Fig. 12 is a vertical cross-sectional view of the cutting device.

Fig. 13 is a top plan view of a completed grid structure.

Fig. 14 is a side elevational view of a completed grid structure.

Fig. 15 is a top plan view of the grid wire supporting means and the welding device.

Fig. 16 is a side elevational view of the same structure.

Fig. 17 is an enlarged view partly in cross-section of the support for the welding element.

Fig. 18 is an enlarged cross sectional view taken on the line 18—18 of Fig. 13 showing the notched support.

It is among the special purposes of the present invention to provide a machine which will form a grid shaped member composed of two continuous wires wound around at a constant pitch spaced supporting bars of any length. In accordance with the invention to render the grid structure more permanent, the wire is automatically welded to the respective supports. Thus, it will be seen that it is possible to produce a rigid strong grid structure, which is permanent. The machine is also adapted to cut the completed grid structure into desired lengths. This completed structure is particularly adapted for use in the well-known DeForest audion, and while for the purpose of an illustration of a specific use of a grid structure embodying this invention, there is shown at Figs. 13 and 14, such a grid electrode of an audion, it is to be understood that it is not desired to be limited or restricted to this specific use, which this invention is especially adapted for, nor is it desired that the machine be considered as solely and exclusively for the production of grids for vacuum tubes.

It is, of course, evident that the machine may be used for constructing other similar structures.

Referring now to the drawings, a supporting plate is shown at 1, having mounted thereon at suitable points the supports 2, 3 and 4. Adjacent the end of the machine at which support 2 is disposed, there is journalled a horizontal rotatable shaft 5, having mounted thereon two rotatable spools 6, that are supported by two parallel straps 10 and a block 11 attached to the shaft 5. One end of the shaft 5 is journalled in the support 7, and the other end is attached by means of the collar 8 to the block 14 which is mounted for rotation as will be described later. The shaft 5 is partly hollow and slots extend through the walls thereof in which are mounted for rotation small pulleys 9—9. The spools 6 are journalled in the straps 10 by means of the spindle 12 and circular cores 13.

The block 14 is mounted on the hollow rotatable shaft 16, which is journalled in the bearing 15 in the bracket 2. On the other end of the shaft is keyed a large gear wheel 17, within which is secured a circular plate 18, having at its center a hollow element 19. Passing through the walls of the hollow shaft and the element 19 are two passages 20 disposed at an angle to each other. Secured by means of the element 22 to the element 19 is a projecting spindle 21 which protrudes through the block 23, bolted to the support 3. The block 23 is provided with a bore therethrough which is provided with threads of such pitch as to cut notches on the surface of the support wires S W sufficiently separated to give the desired spacing between the grid wire turns G W. Of course, the pitch of the threads may be finer and the grid wires wound in every other notch as indicated in Fig. 5. A stop 25 is mounted on the inner face of block 23.

Forming part of standard 3 is a bracket 27, having projecting from one end arm 28 in which is held to shaft 29 on which is rotatably mounted the spool 30 for holding the grid wire. The spool is resiliently held in place by means of spring washer 32 and the spindle 29, which is held by means of the lever 31 having a notch for cooperating with a groove in the spindle. At the end of support 27, adjacent the spool is a small eyelet 33, which in conjunction with eyelet 34 serves as a guide for the grid wire as it passes from the spool and around the supports as will be described later.

The welding electrode 35 in the form of a wheel is mounted for rotation in the bracket 36. Spring clips 37 serve to carry the current thereto in conjunction with the braided cable 43 and binding post 42. The bracket 36 is mounted on the spring pressed spindle 38, which is slidably mounted in the housing 39 secured to the support 27. The spring 40 encircling the guide spindle 42 having on its end the knobs 41 serves to permit the welding wheel to be resiliently forced with a yielding pressure against the grid structure at the time of welding.

Referring to Figs. 3 and 8, there is shown the insulating block 44 mounted on the side of bracket 2, a spring contact member 45 is secured to the insulating block 44 and has a contact thereon for cooperation with the contact on the spring 46 secured to the insulating block 47. The operation of the spring 45 is controlled by means of cam 48, cooperating with the arm 49, formed with a cam follower. When the cam follower drops into the notched portion of the cam 48, the circuit is broken between the contacts on the springs 45 and 46. This permits several turns to be wound on the supports without being welded thereto.

Encircling the block 14, which is formed with an eccentric, see Fig. 4, is an arm 50 adapted to slide vertically in the slot 51' in plate 53 and guided by the pin 52. Mounted on the pin 52 is pivoted a pawl 54, which cooperates with the ratchet wheel 56 concentric with the cam 48 for rotation therewith. A spring 54' serves to hold the pawl against the teeth of the ratchet wheel. Mounted on the insulating block 47 are two pairs of spring arms 55 and 46, having contacts thereon, see Figs. 2 and 8. The respective members of the arms 55 and 46 are electrically connected together so as to be in parallel. Pivotally mounted on the block 59 is the arm 57, having a cam surface thereon for cooperation with the two pins 58, mounted on the rotatable block 14. The block 59 is secured to the bracket 61, and the motion of the arm 57 is controlled by means of the thumb screw 60. When the cam surface of arm 57 is out of contact with the pin 58, it swings back freely against an adjustable stop 62 permitting the springs 55 to separate, opening the circuits at these contacts. It will be noted that mounted on the same pivot as rod 57 is another arm 57', which operates contacts 62, and which cooperates with the other pin 58, thus allowing the speed of the machine to be doubled and preventing arching of contact points.

In Fig. 11, which shows the cutting device, the cutting knives 64 and 65 are shown slidably mounted in the tracks formed by the plates 72 secured to the face of the disk 80. The arms 66 and 67 are pivotally mounted on the disk 80 and contact at their ends with the two cutter blades 64 and 65. At their upper ends are pivoted two links 68 and 69, which are in turn pivoted to the lever 70 on opposite sides of its pivot 71. Thus, by means of this toggle structure when a force is applied to the outer end of arm 70, the two cutters are forced inwardly towards each other. Mounted on the cutter blades 64 and 65 are two pins 73 and 74, which press against two arms 75, pivoted at 77, and forced outwardly against these pins by means of the spring 76, so that when the moving force is removed from the arms 70, a spring 76 forces the cutter blades apart to normal position. The disk 80 is mounted on the same shaft as the driving gear wheel 78 and can slide thereon against the action of springs 94, so that during the cutting operation and while the grid structure is still advancing the cutting apparatus may be moved with it, so as not to cause any jamming. Immediately after the cutting action, the springs 94 can return the plate 80 to normal position. Encircling the edge of the plate 80 is a guided ring 92, cooperating with the plate 93, so as to cause the plate 80 to move smoothly during the cutting operation. The hollow shaft which supports the gear 78 is threaded as shown at 80', so that the severed grid may be gradually fed outwardly into a receptacle.

Supported at the rear of bed plate 1 are the electromagnets 81 and adjacent the cores of which is pivotally mounted the plate 82 having attached thereto a rack 83. When the magnets 81 are energized, the rack 83 is pulled towards the magnets against the action of spring 84, which returns the rack to normal position when the magnets become deenergized. Mounted on the bracket 27' is an arm 85 having at its end a circular rack adapted to cooperate with the teeth of rack 83, so as to rotate a short spindle 85' journaled in the bracket 27', which causes the short pin 86 to move into and out of the path of the arm 70, which operate the cutter blades at the proper time. The circuit of the electromagnets is controlled by the spring arms 87, see Fig. 1, which are caused to contact by means of the cam 88 and the slidable pin 89, which contacts with the cam 88. Mounted in the same support as the slidable pin 89 is another pin for cooperation with the toothed wheel 90. The cam 88, toothed wheel 90, ratchet wheel 56 and cam 48 are all mounted on the same shaft, and are caused to rotate by means of the pawl 54. The toothed wheel 90 merely serves to prevent back lash in the shaft which supports it when the pawl 54 is moving to the next tooth. A counter 150 which forms no part of this invention is operated by means of the arm 151 on the shaft 90' for keeping count of the number of grids produced by the machine.

In Figs. 1, 6 and 7 is shown the clutch which comprises the supporting element 95, having journalled therein the shaft 96 and having keyed to one end the driving pulley 97. Secured to the shaft 96 is the toothed clutch element 98, which cooperates with the other half of the clutch element 99, which is secured to the block 103 keyed to shaft 100. The inner end of shaft 100 is enlarged and is hollow and receives the inner end of shaft 96 as a guide for it and as a strengthening means for the structure. One end of the connected element 99 is tapered and cooperates with the circular frictional element 102, which serves to grip it and prevent its rotation, when out of engagement with the other half of the clutch element 98. Encircling and resting in the groove of the clutch element 99 is a forked member 104 mounted on the shaft 104' which extends throughout the bracket 4. An arm 106 guided in a slot on bracket 107, see Fig. 3, by means of the element 108 is attached to the shaft 104', which causes it to rotate by manual control of the arm 109. Thus, when the arm 109 is raised upwardly, the shaft 104' rotates so as to move the slidable clutch elements 99 into engagement with the element 98, thus causing the shaft 100 to rotate. The shaft 100 has mounted therein the gears 101 and 105 which cooperate respectively with the large gear wheels 17 and 78. The end of the shaft 100 is adjacent the gear 101 and journalled in the bracket 2 as is shown in Fig. 8. At 120 and at the back of the machine is shown a terminal block which the terminals of the various electric circuits may be connected to. The operation of the machine is as follows.

Assuming that the two parallel supports which are fed from the spools 6 and marked SW, see Fig. 5, have been threaded through the machine and are being operated on by the threads 24 in block 23, when the clutch is thrown into engagement the gear 78 and the cutter elements mounted thereon rotate at the same rate of speed as the gear 17 and the structure mounted on shaft 5. The parallel support wires S W are drawn through block 23 by threads acting thereon which at the same time notch the surfaces of the wires S W. The pulling action of the threads on the wires S E draws them from the spools 6 through the hollow shaft 5 and feeds them along guide 21. The grid wire on spool 30 is spirally wrapped around the two supports and each time one of the support wires contacts with the welding element 35, the electric circuit is completed between either set of contacts 55 and 62 by means of the pins 58 and arms 57 and 57'. The spring arms 55 and 62 are connected together in parallel, so that they are operated alternately. This prevents undue heating of the contact points. When the finished grid structure progresses forward and between the cutter blades of the cutting element to a predetermined length, the electric circuit to the electromagnets 81 is completed at the spring 87 and the pin 86 is moved over into the path of the pivoted arm 70, which operates to force the cutter blades together and sever the completed grid which is fed by means of a spiral thread 80', to a suitable container. When the arms 49, see Fig. 8 drops into the notch of cam 48, and during its stay therein, the spring arm 45 breaks the electric circuit with spring 46, thus preventing the welding operation for approximately two revolutions, so that the grid when it is cut off always has at one end several unwelded turns. This is particularly desirable in connection with grids for vacuum tubes and in order to leave the support wires free for a short distance to permit mounting of the grid in the vacuum tube.

Having now described our invention, we wish it to be distinctly understood that it is evident that many changes and modifications may be made in the details of construction and arrangement of parts without departing from the spirit and scope of our invention, and we, therefore, do not desire to be limited, except by the appended claims.

What we seek to secure by United States Letters Patent is:—

1. In a grid making machine, means for winding wire around spaced supports, means for welding said wire to said supports, means for cutting the finished structure into desired lengths, and means for rendering said cutting means automatically effective at regularly recurrent intervals.

2. In a grid making machine, means for winding wire around spaced supports, means for simultaneously welding said wires to said supports, means for cutting the finished structure into desired lengths, and means for rendering said cutting means recurrently effective in timed relation with said winding means.

3. In a grid making machine, means for feeding a plurality of spaced supports, means for winding a wire around said supports, means for welding said wire to said support, means for cutting the finished structure into desired lengths, and means for recurrently operating said cutting means upon the feeding of predetermined lengths of said supports.

4. The combination with a support, means for winding a wire around said support, means for welding the wire to said support, means for cutting the finished structure into desired lengths, and means for recurrently operating said cutting means upon the feeding of predetermined lengths of said supports.

5. The combination with a support, means for feeding a wire to said support, means for rotating said support and simultaneously advancing the same in one direction whereby said wire is wound therearound at a constant pitch, means for welding said wire to said support, and means automatically effective in timed relation with said rotating means for cutting the finished structure into desired lengths.

6. The combination with spaced supports and means for supporting the same, means for rotating said spaced supports as a unit and simultaneously advancing the same, means for feeding a wire to said spaced supports, whereby when said spaced supports are rotated and as a unit and advanced said wire winds therearound, means controlled by the rotation of said supports for welding said wire thereto, and means automatically effective at regularly recurrent intervals for cutting the finished structure into lengths of any desired extent.

7. The combination with a wire winding device of a welding device, means controlled by said wire winding device for operating said welding device, and means automatically effective in timed relation with said winding device for cutting the finished article into suitable lengths.

8. The combination with a wire winding device of a welding device, means controlled by said wire winding device for operating said welding device, means for interrupting the welding operation periodically, and means controlled by said winding device for cutting the finished structure at the unwelded points to leave several turns of wire free at one end of the finished article.

9. The combination with a wire winding device of an electric welding device, an electric circuit for said welding device, means controlled by said winding device for controlling said circuit, and means for cutting the finished article to desired lengths, said cutting means being automatically operated in timed relation to said winding device.

10. The combination with a wire winding device of an electric welding device, a normally open electric circuit for said welding device, means controlled by said winding device for closing said circuit, and means periodically controlled by said winding device for cutting the structure into desired lengths.

11. The combination with a wire winding device, of an electric welding device, a normally open electric circuit for said welding device, means controlled by said winding device for momentarily closing said circuit and again opening the same means for cutting the structure to desired lengths, and means for rendering said cutting means automatically effective at periodically recurring intervals.

12. The combination with a welding device of a wire winding device and means actuated by said wire winding device for actuating said welding device at predetermined intervals, and means controlled by said winding device for cutting the structure into suitable lengths.

13. The combination with an electric welding device and a normally open circuit therefore of a wire winding device, means actuated by said wire winding device for momentarily closing said circuit at predetermined intervals, and means for cutting the finished structure into desired lengths, said cutting means being automatically operated in timed relation with said winding device.

14. The combination with spaced journals of means for supporting therebetween spaced supports, means for rotating said spaced supports and simultaneously moving the same longitudinally, means for feeding wire to said supports whereby upon the rotation and longitudinal movement thereof, said wire is wound therearound, means for welding the wire at each of its points of contact with the supports thereto and, means controlled by said rotating means for cutting the finished article to desired lengths.

15. In a machine for making helically wound grids, the combination of a wire winding device of a welding device, and cutting means automatically operated in timed relation with said winding device, and means for automatically operating said cutting means in timed relation with said welding means.

16. In a grid making machine the combination with rotatable means for supporting the support stock of means for advancing the supports in spaced relation in one direction, means for winding a wire on the supports whereby the wire is spirally mounted on said spaced supports, means for cutting the finished article to suitable lengths, and means for rendering said cutting means automatically effective at periodically recurring intervals.

17. In a grid making machine the combination with rotatable means for supporting the support stock of means for advancing the supports in one direction in spaced relation, means for winding a wire on the supports whereby the wire is spirally mounted on said spaced supports, means for welding the wire on the supports, means for interrupting the welding operation at regular intervals, means for cutting said supports, and means for rendering said cutting means automatically effective during the interruption of the welding operation.

18. In a grid making machine the combination with rotatable means for supporting the support stock of means for advancing the supports in one direction, means for winding a wire on the spaced supports, whereby the wire is spirally mounted on said spaced supports, means for welding the wire on the supports, means for cutting the finished article at the points where the wires are not welded to supports, whereby the wire is left free for several turns at one end of each finished grid, means for automatically rendering said cutting means recurrently effective.

19. In a winding machine, a rotatable element for holding the support stock, means for simultaneously notching and feeding the stock from said element to provide spaced supports, means for supporting the winding wire, means for winding the wire in said notches, means for welding the wire to said spaced supports for a predetermined interval, electro-magnetically operated cutting means for cutting the finished structure into desired lengths and means for feeding the finished article out of the machine.

20. In a winding machine, a rotatable element for holding the support stock, means for feeding the stock from said element to provide spaced supports, means for supporting the winding wire, means for winding the wire on the stock, means for welding the wire to said spaced supports for a predetermined interval, electro-magnetically operated cutting means for cutting the finished structure into desired lengths and means for disengaging the whole machine from its power driving element.

21. In a winding machine, a rotatable element for holding the support stock, means for notching and feeding the stock from said element to provide spaced supports, means for supporting the winding wire, means for winding the wire on the supports, means for welding the wire to said spaced supports for a predetermined interval, means operated by the notching and feeding device for interrupting the welding operation whereby several turns are wound in place without being welded and electro-magnetically tripped cutting means having a circuit closing device operated by said notching and feeding means.

22. The method of making a wound article which comprises notching and feeding a plurality of supports in spaced relation winding a wire on the notched supports, whereby a spiral winding results, welding the wire in each notch and then cutting the articles to length.

23. The method of making a wound article which comprises notching and feeding a plurality of supports in spaced relation, winding a wire on the supports and the notches, whereby a spiral winding results, electrically welding the wire in each notch and then cutting the articles to length.

24. The method of making a wound article which comprises notching and feeding a plurality of supports in spaced relation, winding a wire on the supports in the notches whereby a spiral winding results electrically welding the wire in each notch, for a predetermined distance, interrupting the welding operation for several turns, and finally cutting the finished articles to length at the point where the welding operation begins.

25. The method of making a wound article which comprises feeding a plurality of supports in spaced relation, winding a wire on the supports whereby a spiral winding results, electrically welding the wire to the supports and then cutting the articles to length in timed relation to the welding operation.

26. A machine for making grids comprising a rotary head, an arbor in said head, means for moving a support-wire over said arbor, said means also serving to form slots in said wire.

27. A machine for making grids comprising a rotary head, an arbor in said head, means for moving a support-wire over said arbor, and for forming slots in said wire, means for inserting a wire in said slots and means for securing said wire to said support-wire.

28. A machine for securing a helically wound wire to another wire comprising means for forming slots in spaced relation on one wire and means for bending another wire into a helix with its convolutions held in spaced relation by engagement with said slots, said slot forming means also serving to feed said other wire through the machine.

29. A machine for making a grid electrode comprising means for moving a support wire, said means also forming notches in spaced relation along said wire, and means for winding another wire into a series of convolutions disposed in said notches to provide a helix having its pitch determined by the spacing of said notches.

30. A machine for making a grid electrode comprising means for holding a support-wire, said means also forming slots in spaced relation along the support-wire, and means for helically winding a wire about said support-wire with the convolutions of said wound wire in the slots in said support-wire.

31. The method of manufacturing grids for electron discharge devices which includes the step of positioning a support wire on a rotatable mandrel and rotating said mandrel simultaneously to notch said wire and feed the notched wire to a cutting point.

32. The method of manufacturing grids for electron discharge devices which comprises supporting a grid support wire on a rotatable mandrel and subjecting said wire while on said mandrel to a screw threading movement to simultaneously notch said wire and feed it forward to a cutting point.

33. The method of manufacturing grids for electron discharge devices which comprises revolving a pair of spaced grid support wires, subjecting said wires to a screw threading action while so revolving to notch said wires and simultaneously feed them to a cutting point, helically winding a continuous wire around said support wires while the latter are being rotated and fed forward, and automatically cutting the support wires at regularly recurrent intervals.

34. The method according to claim 33 in which alternate groups of turns of said continuous wire are welded to said support rods.

35. The method according to claim 33 in which alternate groups of turns of said continuous wire are welded to said support rods, and said support rods are automatically cut at the points where the turns of said continuous wire are unwelded.

36. The method of manufacturing grids for electron discharge devices which comprises supporting a grid support wire, notching said wire at spaced intervals throughout its length, winding a continuous wire helically around said support wire, and welding alternate groups of turns of said continuous wire to said support wire.

37. The method of manufacturing grids for electron discharge devices which comprises feeding a grid support wire by a screw threading action longitudinally to a cutting point, notching said wire during the feeding movement at spaced intervals throughout its length, winding a continuous wire helically around said support wire, welding only certain turns of said continuous wire to said support wire and automatically cutting said support wire adjacent the points where the turns of said continuous wire are unwelded.

38. In a machine of the character described the combination of single means for feeding a grid support wire to a cutting point and simultaneously notching said wire at regularly spaced intervals.

39. In a machine of the character described, means for subjecting a grid support wire to a screw threading operation to feed said wire to a cutting point.

40. In a machine of the character described means for supporting a grid support wire, means for notching said wire at regularly recurrent intervals, means for winding a continuous wire helically around said support wire, and means for welding the turns of said continuous wire to said support wire.

41. A machine according to claim 40 in which means are provided for cutting said support wire at regularly recurrent intervals at points adjacent where the turns of said continuous wire are unwelded.

In testimony whereof we have hereunto set our hands on this 22nd day of July, A. D. 1926.

CARL R. SCHENK.
SYLVESTER W. CROWLEY.